United States Patent
Takeda et al.

(10) Patent No.: US 10,801,183 B2
(45) Date of Patent: Oct. 13, 2020

(54) WHEEL LOADER

(71) Applicant: Hitachi Construction Machinery Co., Ltd., Taito-ku, Tokyo (JP)

(72) Inventors: Kazuya Takeda, Chiba (JP); Isamu Aoki, Ibaraki (JP); Kazuo Ishida, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 267 days.

(21) Appl. No.: 15/753,806

(22) PCT Filed: Mar. 2, 2017

(86) PCT No.: PCT/JP2017/008372
§ 371 (c)(1),
(2) Date: Feb. 20, 2018

(87) PCT Pub. No.: WO2017/159389
PCT Pub. Date: Sep. 21, 2017

(65) Prior Publication Data
US 2019/0010679 A1    Jan. 10, 2019

(30) Foreign Application Priority Data
Mar. 16, 2016 (JP) ................. 2016-052741

(51) Int. Cl.
*E02F 9/22* (2006.01)
*F16H 61/433* (2010.01)
(Continued)

(52) U.S. Cl.
CPC ............ *E02F 9/2246* (2013.01); *B60K 20/00* (2013.01); *E02F 3/3411* (2013.01); *E02F 9/202* (2013.01);
(Continued)

(58) Field of Classification Search
CPC ..... E02F 9/2246; E02F 3/3411; E02F 9/2253; E02F 9/202; E02F 9/2296; E02F 3/431;
(Continued)

(56) References Cited

U.S. PATENT DOCUMENTS 5,295,353 A * 3/1994 Ikari ................... E02F 9/2246
                                                 417/34
2009/0240406 A1 * 9/2009 Fukushima ........... B60W 10/10
                                                 701/54
(Continued)

FOREIGN PATENT DOCUMENTS

CN          104918835 A    9/2015
EP          2 927 071 A1    10/2015
(Continued)

OTHER PUBLICATIONS

International Search Report (PCT/ISA/210) issued in PCT Application No. PCT/JP2017/008372 dated Jun. 6, 2017 with English translation (five pages).

(Continued)

*Primary Examiner* — Khoi H Tran
*Assistant Examiner* — B M M Hannan
(74) *Attorney, Agent, or Firm* — Crowell & Moring LLP

(57) ABSTRACT

The work vehicle includes: a clutch device including a forward-travel clutch and a backward-travel clutch configured to cause, when being in an engagement state, the work vehicle to travel in a forward travel direction and a backward travel direction; a forward-backward travel instruction device configured to instruct the work vehicle to travel in the forward travel direction or the backward travel direction; a clutch state detection device configured to detect whether the forward-travel clutch and the backward-travel clutch are each in the engagement state; and a torque restriction section configured to restrict a maximum absorbing torque of the (Continued)

hydraulic pump to be low when a restriction condition holds, the restriction condition including a condition that a traveling direction of the work vehicle, which corresponds to an engagement state of the clutch device, and a traveling direction of the work vehicle, which is instructed by the forward-backward travel instruction device are opposite to each other.

4 Claims, 12 Drawing Sheets

(51) Int. Cl.
*F02D 29/02* (2006.01)
*F02D 29/04* (2006.01)
*F16H 61/478* (2010.01)
*B60K 20/00* (2006.01)
*E02F 9/20* (2006.01)
*F04B 17/03* (2006.01)
*F04B 49/06* (2006.01)
*E02F 3/34* (2006.01)
*F16D 23/00* (2006.01)
*E02F 3/43* (2006.01)

(52) U.S. Cl.
CPC .......... *E02F 9/2253* (2013.01); *E02F 9/2296* (2013.01); *F02D 29/02* (2013.01); *F02D 29/04* (2013.01); *F04B 17/03* (2013.01); *F04B 49/06* (2013.01); *F16D 23/00* (2013.01); *F16H 61/433* (2013.01); *F16H 61/478* (2013.01); *E02F 3/431* (2013.01)

(58) Field of Classification Search
CPC .. F16D 23/00; F16D 2500/1112; F04B 49/06; F04B 17/03; B60K 20/00; F16H 61/478; F16H 61/433; F02D 29/04; F02D 29/02

USPC .... 701/50, 51, 54, 69; 192/3.28–3.55, 85.11
See application file for complete search history.

(56) References Cited

U.S. PATENT DOCUMENTS

| | | | |
|---|---|---|---|
| 2010/0032219 A1* | 2/2010 | Udagawa | B60K 6/46 180/65.265 |
| 2010/0131158 A1 | 5/2010 | Saito | |
| 2010/0324788 A1* | 12/2010 | Toda | E02F 9/2246 701/50 |
| 2011/0308878 A1* | 12/2011 | Shirao | F16H 61/47 180/305 |
| 2011/0313627 A1 | 12/2011 | Ishikawa et al. | |
| 2014/0005900 A1 | 1/2014 | Tanaka et al. | |
| 2015/0337877 A1 | 11/2015 | Miyamoto et al. | |
| 2016/0002883 A1* | 1/2016 | Sakon | F16D 48/02 414/685 |
| 2017/0101763 A1* | 4/2017 | Nishimura | B60W 10/103 |
| 2017/0130428 A1 | 5/2017 | Matsuzaki et al. | |

FOREIGN PATENT DOCUMENTS

| | | |
|---|---|---|
| EP | 2 927 072 A1 | 10/2015 |
| JP | 2005-23870 A | 1/2005 |
| JP | 2009-150216 A | 7/2009 |
| JP | 2009-204032 A | 9/2009 |
| JP | 2013-167099 A | 8/2013 |
| JP | 2015-86575 A | 5/2015 |
| WO | WO 2009/019974 A1 | 2/2009 |
| WO | WO 2016/017674 A1 | 2/2016 |

OTHER PUBLICATIONS

Japanese-language Written Opinion (PCT/ISA/237) issued in PCT Application No. PCT/JP2017/008372 dated Jun. 6, 2017 (three pages).

* cited by examiner

WHEEL LOADER

TECHNICAL FIELD

The present invention relates to a work vehicle.

BACKGROUND ART

In a known work vehicle such as a wheel loader (refer to Patent Literature 1), output of an engine is transferred to a drive wheel and also to a work machine through a variable-capacity hydraulic pump. The work vehicle disclosed in Patent Literature 1 includes a control unit configured to determine that a travel load is high when the travel load equal to or larger than a predetermined threshold and reduce the absorbing torque of the hydraulic pump to reduce a work hydraulic pressure load.

The work vehicle such as a wheel loader performs excavation and cargo handling work, for example, as described below.

Work 1: The driver operates a work machine operation lever so that the bucket of the work vehicle is parallel to the ground at a slight height from the ground. The driver switches a forward-backward travel switching lever to a forward travel side.

Work 2: The driver steps on and operates the acceleration pedal to travel the wheel loader forward to an object such as dirt so that the bucket is put into the object. Then, the driver operates the operation lever to load the object into the bucket.

Work 3: The driver operates the operation lever to gradually rotate the bucket in a backward tilting direction (upward direction) while moving up an arm. When having moved the arm up to an excavation end height, the driver operates the operation lever to stop moving up the arm and simultaneously rotate the bucket in the backward tilting direction (upward direction) so that the object is put on the backward side in the bucket. Accordingly, a stable cargo shape is formed.

Work 4: The driver switches the forward-backward travel switching lever to a backward travel side, and then steps on and operates the acceleration pedal to travel the wheel loader backward so that the wheel loader is separated from any other remaining object.

Work 5: The driver switches the forward-backward travel switching lever to the forward travel side, and then, steps on and operates the acceleration pedal to travel the wheel loader forward until the wheel loader becomes close to a cargo truck on which the object is to be transported.

Work 6: The driver operates the operation lever to move the arm up to a release height, and then operates the operation lever to rotate the bucket in a forward tilting direction (downward direction) and release the object onto the cargo truck.

CITATION LIST

Patent Literature

Patent Literature 1: Japanese Patent Laid-open No. 2009-150216

SUMMARY OF INVENTION

Technical Problem

In a case of a small work place, for example, the operation of moving up the arm, which is described above in Work 6, is started at the stage described above in Work 5 in some cases. In such a case, in Work 5, the engine receives, through wheels and a transmission, a load due to inertial energy when the work vehicle transitions from backward travel to forward travel, and also receives a load from the hydraulic pump for driving the work device (arm). As a result, the engine receives a load larger than the output torque of the engine, and a phenomenon called lug down in which the rotational speed of the engine temporarily drops potentially occurs. In particular, in a work vehicle in which the drive power of the engine is transferred to the wheels through a HMT or EMT including a machine transmission unit, the influence of a load received by the engine from the wheels at forward backward travel switching is larger than that for a work vehicle (refer to Patent Literature 1) including a torque converter.

When the absorbing torque of the hydraulic pump is reduced after the travel load is measured, as disclosed in Patent Literature 1, the lug down cannot be effectively prevented due to low response.

Solution to Problem

A work vehicle according to an aspect of the present invention includes a variable-capacity hydraulic pump driven by an engine, a work device driven by hydraulic oil discharged from the hydraulic pump, and a travel drive device configured to transfer drive power of the engine to wheels through a transmission including a machine transmission unit. The work vehicle includes: a clutch device including a forward-travel clutch configured to cause, when being in an engagement state, the work vehicle to travel in a forward travel direction, and a backward-travel clutch configured to cause, when being in an engagement state, the work vehicle to travel in a backward travel direction; a forward-backward travel instruction device configured to instruct the work vehicle to travel in the forward travel direction or the backward travel direction; a clutch state detection device configured to detect whether the forward-travel clutch and the backward-travel clutch are each in the engagement state; and a torque restriction section configured to restrict a maximum absorbing torque of the hydraulic pump to be low when a restriction condition holds, the restriction condition including a condition that a traveling direction of the work vehicle, which corresponds to an engagement state of the clutch device, and a traveling direction of the work vehicle, which is instructed by the forward-backward travel instruction device are opposite to each other.

Advantageous Effects of Invention

The present invention can reduce lug down that occurs when a work device is operated at a forward-backward travel switching operation.

DESCRIPTION OF EMBODIMENTS

A work vehicle according to an embodiment of the present invention will be described below with reference to the accompanying drawings.

Figure 1:
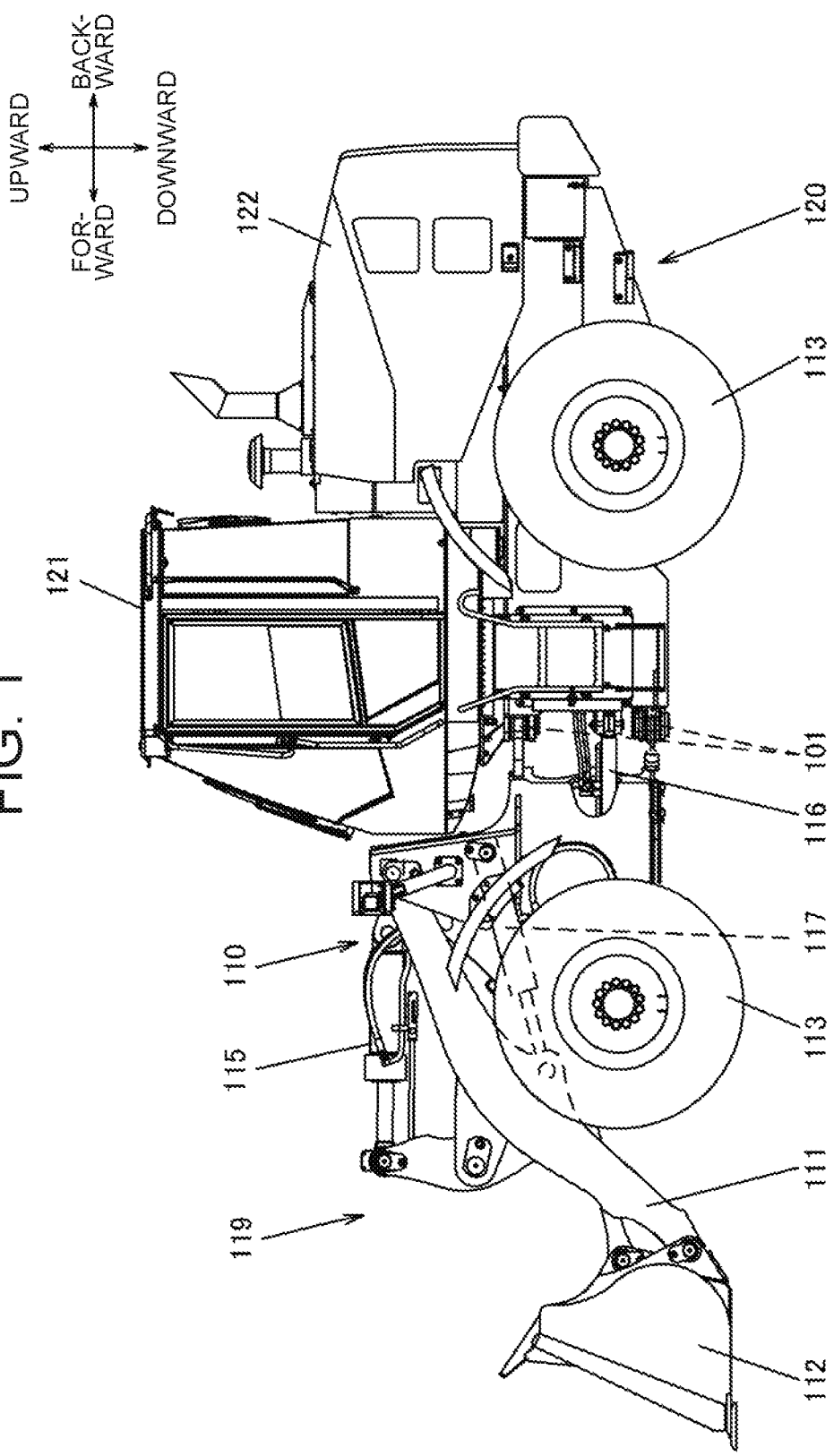
FIG. 1 is a side view of a wheel loader as an exemplary work vehicle according to an embodiment of the present invention.

FIG. 1 is a side view of a wheel loader as an exemplary work vehicle according to an embodiment of the present invention. The wheel loader includes a front vehicle body 110 including an arm (also called a lift arm) 111, a bucket 112, and wheels 113 (front wheels), and a rear vehicle body 120 including an operation room 121, a machine room 122, and wheels 113 (rear wheels).

The arm 111 is rotated (elevated) in an upward-downward direction by drive of an arm cylinder 117. The bucket 112 is rotated (crowds and dumps) in the upward-downward direction by drive of a bucket cylinder 115. A front work device (work system) 119 configured to perform work such as excavation and cargo handling includes the arm 111, the arm cylinder 117, the bucket 112, and the bucket cylinder 115. The front vehicle body 110 and the rear vehicle body 120 are coupled with each other to be freely rotatable relative to each other through a center pin 101. The front vehicle body 110 bends to right and left relative to the rear vehicle body 120 through expansion and contraction of a steering cylinder 116.

The machine room 122 includes an engine. The operation room 121 includes various operation members such as an acceleration pedal, an arm operation lever, a bucket operation lever, and a forward-backward travel switching lever 17 to be described later.

Figure 2:
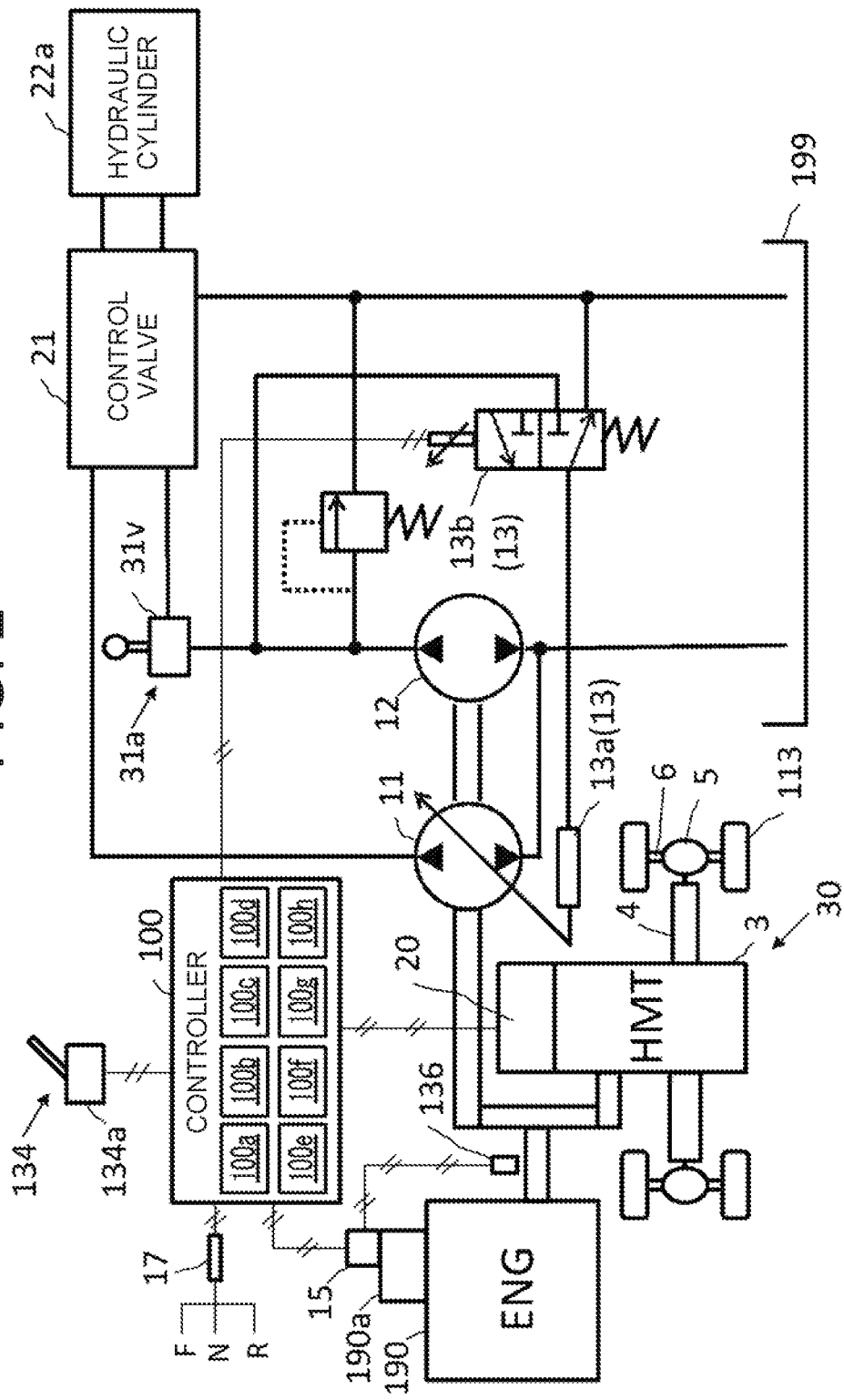
FIG. 2 is a diagram illustrating a schematic configuration of the wheel loader.

FIG. 2 is a diagram illustrating a schematic configuration of the wheel loader. The wheel loader includes control devices such as a controller 100 and an engine controller 15. The controller 100 and the engine controller 15 each include an arithmetic processing device including a CPU, a storage device such as a ROM or a RAM, and any other peripheral circuit, and control each component (such as a hydraulic pump, a valve device, or the engine) of the wheel loader.

Figure 3:
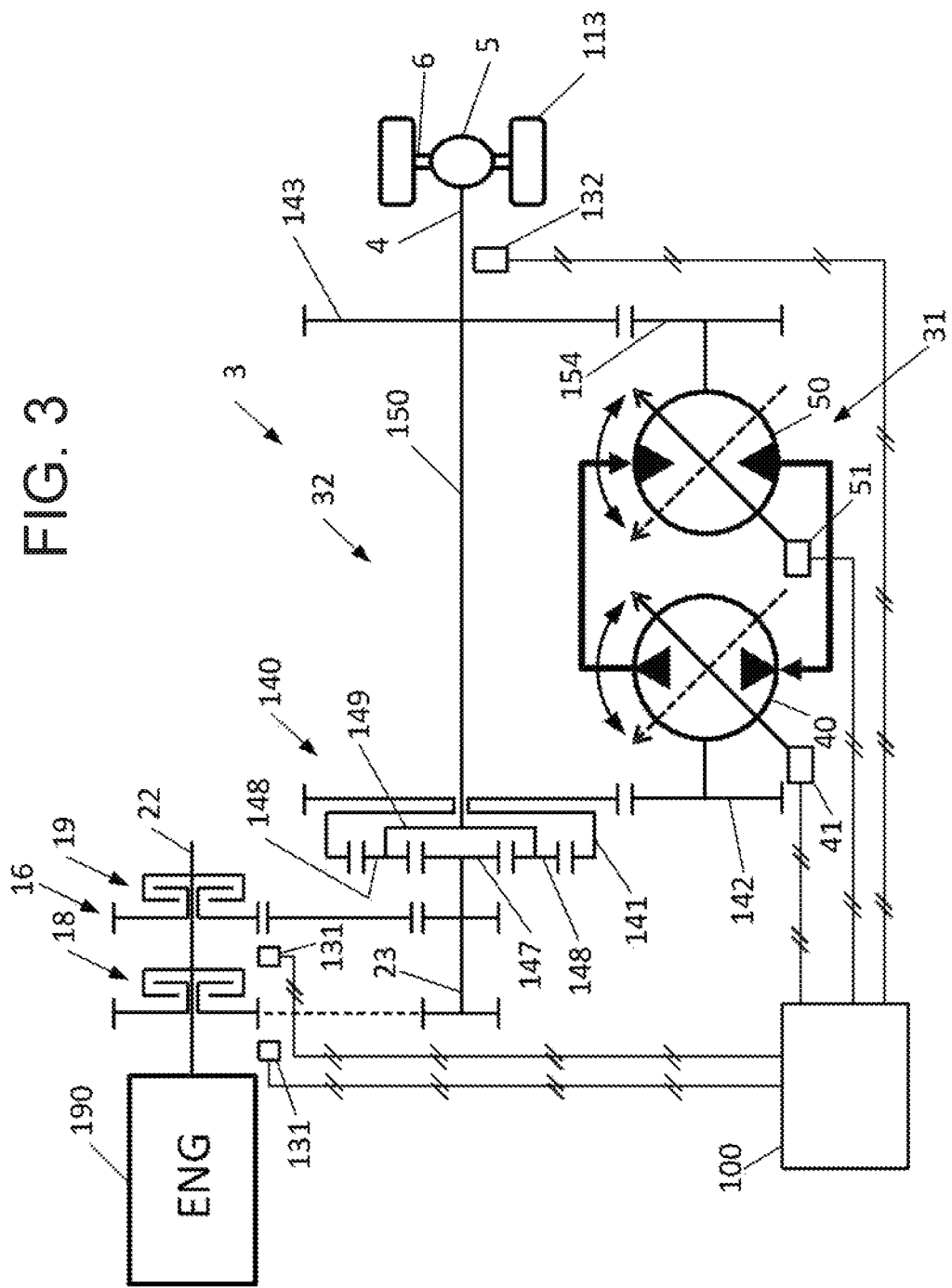
FIG. 3 is a diagram illustrating a schematic configuration of a HMT.

The wheel loader includes a travel drive device (travel system) 30 configured to transfer drive power of an engine 190 to the wheels 113. The travel drive device 30 includes a hydro-mechanical transmission (HMT) 3, a propeller shaft 4, an axle device 5, and an axle 6. The engine 190 has an output shaft is coupled with the HMT 3. FIG. 3 is a diagram illustrating a schematic configuration of the HMT 3. The HMT 3 includes a hydro static transmission (HST) 31 and a machine transmission unit 32, and transfers the drive power of the engine 190 to the HST 31 and the machine transmission unit 32 in parallel. The rotational speed of the output shaft of the engine 190 is changed by the HMT 3. The rotation after the speed change is transferred to the wheels 113 through the propeller shaft 4, the axle device 5, and the axle 6, and the wheel loader travels accordingly.

The HMT 3 includes a clutch device 16 including a forward-travel hydraulic clutch (hereinafter referred to as a forward travel clutch 18) and a backward-travel hydraulic clutch (referred to as a backward travel clutch 19). The forward travel clutch 18 and the backward travel clutch 19 performs an engagement (connection) operation when the pressure (clutch pressure) of hydraulic oil supplied through a transmission control device 20 (refer to FIG. 2) increases, and performs a release (disconnection) operation when the clutch pressure decreases.

The output shaft of the engine 190 is coupled with a clutch shaft 22. When the forward travel clutch 18 is in an engagement state, the backward travel clutch 19 is in a release state, and the clutch shaft 22 rotates integrally with the forward travel clutch 18 so that the wheel loader travels in a forward travel direction. When the backward travel clutch 19 is in an engagement state, the forward travel clutch 18 is in a release state, and the clutch shaft 22 rotates integrally with the backward travel clutch 19 so that the wheel loader travels in a backward travel direction.

The rotational force of the clutch shaft 22 is transferred to an input shaft 23 through a gear. A sun gear 147 of a planetary gear mechanism 140 is fixed to the input shaft 23. A plurality of planetary gears 148 are provided around and meshed with the sun gear 147. Each planetary gear 148 is pivotally supported by a planetary carrier 149 fixed to an output shaft 150. The output shaft 150 is connected with the propeller shaft 4. A ring gear 141 is provided around and meshed with the planetary gears. A pump input gear 142 is provided around and meshed with the ring gear 141. The pump input gear 142 is fixed to a rotational shaft of a travel hydraulic pump (hereinafter referred to as a HST pump 40). The HST pump 40 is connected with a travel hydraulic motor (hereinafter referred to as a HST motor 50) in a closed circuit. A motor output gear 154 is fixed to the rotational shaft of the HST motor 50 and meshed with a gear 143 of the output shaft 150.

The HST pump 40 is a tilted-plate or tilted-shaft variable-capacity hydraulic pump, the displacement volume of which changes in accordance with a tilt angle. The displacement volume is controlled by a regulator 41. Although not illustrated, the regulator 41 includes a tilt cylinder, and a forward-backward travel switching valve configured to switch in response to a forward-backward travel switching signal from the controller 100. The tilt cylinder is supplied with control pressure through the forward-backward travel switching valve to control the displacement volume in accordance with the control pressure, and the direction of operation of the tilt cylinder is controlled in accordance with switching of the forward-backward travel switching valve to control the direction of tilt of the HST pump 40.

The HST motor 50 is a tilted-plate or tilted-shaft variable-capacity hydraulic motor, the displacement volume of which changes in accordance with a tilt angle. The displacement volume (motor capacity) of the HST motor 50 is controlled based on a control signal output from the controller 100 to a motor regulator 51 (not illustrated). To prevent engine stall, when the actual rotational speed of the engine 190 (hereinafter referred to as an actual engine rotational speed Na) is lower than a required rotational speed of the engine 190 (hereinafter referred to as a required engine rotational speed Nr) and the difference therebetween is large, the controller 100 performs control to reduce the displacement volume as compared to when the difference is small.

As described above, in the present embodiment, the HMT 3 of input division type is employed. In the HMT 3 of input division type, the HST motor 50, which is connected, through a hydraulic circuit, with the HST pump 40 coupled with the planetary gear mechanism 140, is coupled with the output shaft 150 of the transmission at an equal rotational ratio. The output torque of the engine 190 is transferred to the HST 31 and the machine transmission unit 32 in parallel through the planetary gear mechanism 140 so that the wheels 113 are driven.

As illustrated in FIG. 2, the wheel loader includes a main pump 11 for work device driving, a control valve 21, and a hydraulic cylinder 22a. The hydraulic cylinder 22a includes the arm cylinder 117 configured to drive the arm 111, and the bucket cylinder 115 configured to drive the bucket 112. The main pump 11 is driven by the engine 190 to take in hydraulic oil inside a hydraulic oil tank 199 and discharge the oil as pressurized oil.

The main pump 11 is a tilted-plate or tilted-shaft variable-capacity hydraulic pump, the displacement volume of which changes. The main pump 11 has a discharge flow rate determined in accordance with the displacement volume and the rotational speed of the main pump 11. The displacement volume of the main pump 11 is controlled by a regulator 13 including a capacitor control actuator 13a and an electromagnetic valve 13b. The electromagnetic valve 13b operates based on a control signal (excitation current) from the controller 100 to generate pilot secondary pressure (command pressure) in accordance with the control signal from the controller 100, and outputs the generated pressure to the capacitor control actuator 13a. As the excitation current from the controller 100 increases, the command pressure increases and the displacement volume decreases (in other words, the maximum absorbing torque decreases). The regulator 13 adjusts the displacement, volume so that the absorbing torque (input torque) of the main pump 11 does not exceed a maximum pump absorbing torque set by the controller 100. As described later, a set value of the maximum pump absorbing torque is changed in accordance with the engagement state of the clutch device 16, the vehicle speed, and the difference between the actual engine rotational speed and the required engine rotational speed.

The hydraulic oil discharged from the main pump 11 is supplied to the hydraulic cylinder 22a through the control valve 21, and the arm 111 and the bucket 112 are driven by the hydraulic cylinder 22a. The control valve 21 is operated by pilot pressure output from a pilot valve 31v of an operation lever 31a, and controls the flow of the hydraulic oil from the main pump 11 to the hydraulic cylinder 22a. The operation lever 31a includes the arm operation lever for outputting a command to move up or down the arm 111, and the bucket operation lever outputting a command for the bucket 112 to crowd or dump.

A pilot pump 12 is a fixed-capacity hydraulic pump that is driven by the engine 190 to take in hydraulic oil inside the hydraulic oil tank 199 and discharge pressurized oil. The pilot pump 12 supplies the pressurized oil to the pilot valve 31v of the operation lever 31a. The pilot valve 31v depressurizes the pressurized oil discharged from the pilot pump 12 and outputs, to the control valve 21, pilot pressure in accordance with the operation amount of the operation lever 31a.

The controller 100 is connected with the forward-backward travel switching lever 17 for instructing the vehicle to travel in the forward travel direction or the backward travel direction, in other words, instructing the traveling direction of the wheel loader. Instruction signals (such as a forward travel signal, a neutral signal, and a backward travel signal) indicating operation positions (a forward travel (F) position, a neutral (N) position, and a backward travel (R) position) of the forward-backward travel switching lever 17 are detected by the controller 100. When the forward-backward travel switching lever 17 is switched to the forward travel (F) position, the controller 100 outputs a control signal for putting the forward travel clutch 18 of the HMT 3 into the engagement state to the transmission control device 20. When the forward-backward travel switching lever 17 is switched to the backward travel (R) position, the controller 100 outputs a control signal for putting the backward travel clutch 19 of the HMT 3 into the engagement state to the transmission control device 20.

When the transmission control device 20 receives the control signal for putting the forward travel clutch 18 into the engagement state or the control signal for putting the backward travel clutch 19 into the engagement state, a clutch control valve (not illustrated) provided to the transmission control device 20 operates to put the forward travel clutch 18 or the backward travel clutch 19 into the engagement state, and accordingly, the traveling direction of the work vehicle is switched to the forward travel side or the backward travel side. When the forward-backward travel switching lever 17 is switched to the neutral (N) position, the controller 100 outputs a control signal for putting the forward travel clutch 18 and the backward travel clutch 19 into the release state to the transmission control device 20. Accordingly, the forward travel clutch 18 and the backward travel clutch 19 are put into the release state, and the HMT 3 becomes a neutral state.

As illustrated in FIG. 3, the controller 100 is connected with a clutch sensor 131 and a vehicle speed sensor 132. The clutch sensor 131 detects whether the forward travel clutch 18 and the backward travel clutch 19 are in the engagement state, and outputs, to the controller 100, an on signal when the clutches are in the engagement state, or an off signal when the clutches are in the release state. The vehicle speed sensor 132 detects the rotational speed of the propeller shaft 4, which is a physical quantity corresponding to the vehicle speed, and outputs a detection signal to the controller 100.

Figure 4:
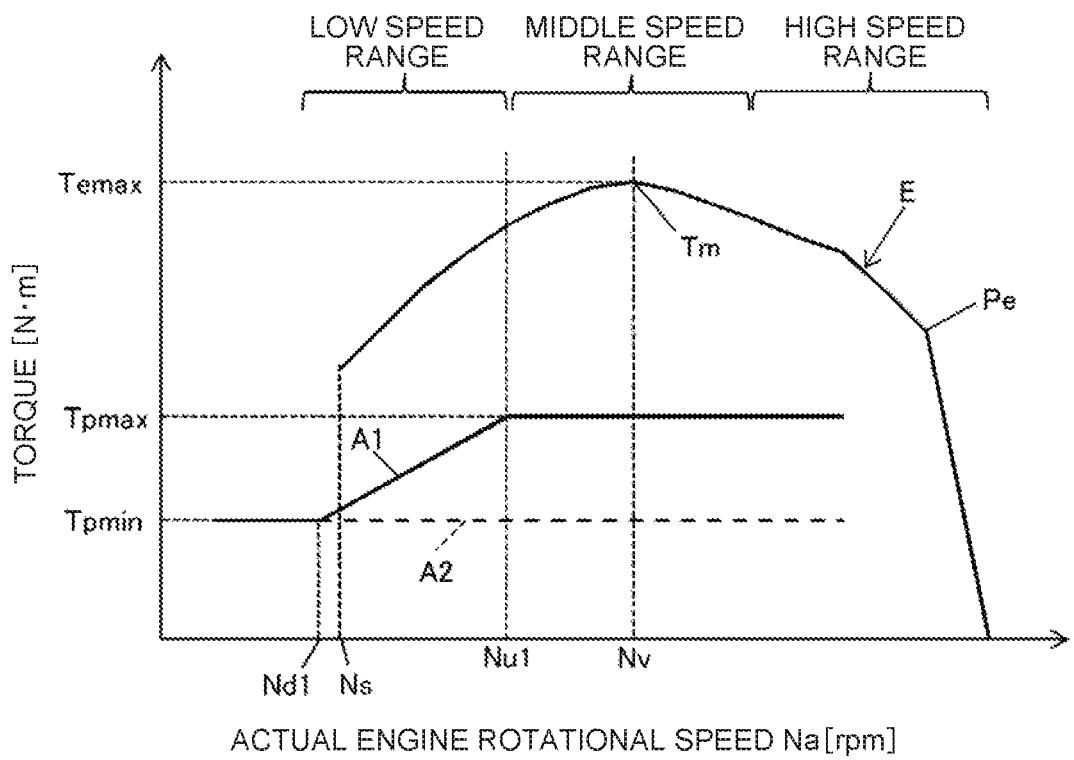
FIG. 4 is a torque chart of the wheel loader.

FIG. 4 is a torque chart of the wheel loader, illustrating an engine output torque characteristic E and pump absorbing torque characteristics A1 and A2. The storage device of the controller 100 stores the engine output torque characteristic E and the pump absorbing torque characteristics A1 and A2 (hereinafter also simply referred to as characteristics A and B) in a look-up table format. As described later, the characteristic A1 is used when a restriction condition does not hold, and the characteristic A2 is used when the restriction condition holds.

The engine output torque characteristic E represents a relation between the actual engine rotational speed Na and the maximum engine output torque. The maximum engine output torque is a maximum torque that the engine 190 can output at each rotational speed. A region defined by the engine output torque characteristic (maximum torque line) indicates performance achieved by the engine 190. The engine mounted on the wheel loader has such a droop characteristic that the torque abruptly decreases in a rotational speed region in which a rated point (rated highest torque) Pe is exceeded. In FIG. 4, a droop line is defined by a straight line connecting the rated point Pe and an engine highest rotational speed in a non-pump-load state.

As illustrated in FIG. 4, in the engine output torque characteristic E, when the actual engine rotational speed Na is equal to or higher than a low idle rotational speed (lowest rotational speed) Ns and equal to or lower than Nv, the torque increases as the actual engine rotational speed Na increases, and reaches at a maximum torque value Temax (maximum torque point Tm) in the engine output torque characteristic E when the actual engine rotational speed Na is Nv. The low idle rotational speed is an engine rotational speed when an acceleration pedal 134 is not operated. In the engine output torque characteristic E, when the actual engine rotational speed Na is higher than Nv, the torque decreases as the actual engine rotational speed Na increases, and rated output is obtained at the rated point Pe. When the actual engine rotational speed Na exceeds a rated rotational speed at the rated point Pe, the torque abruptly decreases.

The pump absorbing torque characteristics A1 and A2 each represent a relation between the actual engine rotational speed Na and the maximum pump absorbing torque (maximum pump input torque). In the pump absorbing torque characteristic A1, when the actual engine rotational speed Na is equal to or lower than Nd1, a minimum torque value Tpmin in the characteristic A1 is obtained irrespective of the actual engine rotational speed Na. When the actual engine rotational speed Na is equal to or higher than Nu1, a maximum torque value Tpmax in the characteristic A1 is obtained irrespective of the actual engine rotational speed Na. In the characteristic A1, the torque increases as the actual engine rotational speed Na increases when the actual engine rotational speed Na is in the range of Nd1 to Nu1. In other words, as illustrated in FIG. 4, the maximum pump absorbing torque set in the characteristic A1 increases from the minimum value Tpmin to the maximum value Tpmax as the actual engine rotational speed Na increases in a low speed range, and has the maximum value Tpmax in a middle speed range and a high speed range. However, the maximum pump absorbing torque set in the characteristic A2 has the minimum value Tpmin irrespective of the actual engine rotational speed Na.

As illustrated in FIG. 2, the controller 100 functionally includes a target speed setting section 100a, a required speed determination section 100b, a restriction condition determination section 100c, a cancellation condition determination section 100d, a torque characteristic setting section 100e, a clutch switching condition determination section 100f, a clutch control section 100g, and a clutch state determination section 100h.

The controller 100 is connected with an operation amount sensor 134a. The operation amount sensor 134a detects a stepping operation amount (operation angle) of the acceleration pedal 134 and outputs a detection signal to the controller 100. The target speed setting section 100a sets a target rotational speed (hereinafter referred to as a target engine rotational speed Nt) of the engine 190 in accordance with the operation amount of the acceleration pedal 134 detected by the operation amount sensor 134a.

Figure 5:
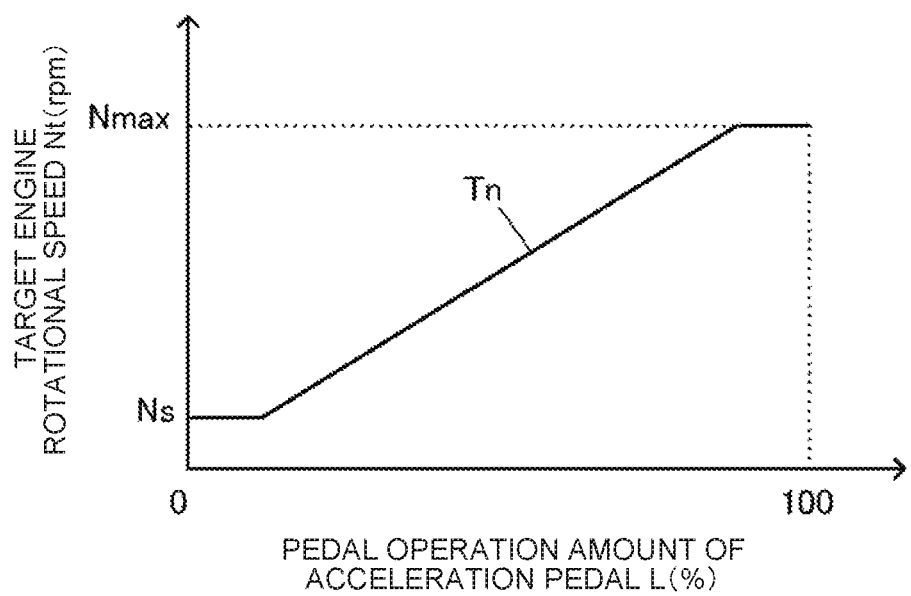
FIG. 5 is a diagram illustrating a relation between an operation amount of an acceleration pedal and a target engine rotational speed.

FIG. 5 is a diagram illustrating a relation between an operation amount L of the acceleration pedal 134 and the target engine rotational speed Nt. The storage device of the controller 100 stores a table of a target engine rotational speed characteristic Tn illustrated in FIG. 5. The target speed setting section 100a refers to the table of the target engine rotational speed characteristic Tn to set the target engine rotational speed Nt based on the operation amount L detected by the operation amount sensor 134a. The target engine rotational speed Nt when the acceleration pedal 134 is not operated (0%) is set to be the low idle rotational speed Ns. The target engine rotational speed Nt increases as the operation amount L of the acceleration pedal 134 increases. The target engine rotational speed Nt at maximum pedal stepping (100%) reaches at a rated rotational speed Nmax at the rated point.

To reduce fuel consumption, for example, the required speed determination section 100b illustrated in FIG. 2 corrects the target engine rotational speed Nt set by the target speed setting section 100a in accordance with the drive state of the wheel loader, and determines the corrected target engine rotational speed Nt to be the required engine rotational speed Nr. The target engine rotational speed. Nt is determined to be the required engine rotational speed Nr with zero correction amount in some cases.

The controller 100 outputs a control signal corresponding to the required engine rotational speed Nr to the engine controller 15. The engine controller 15 is connected with a rotational speed sensor 136. The rotational speed sensor 136 detects the actual engine rotational speed Na and outputs a detection signal to the engine controller 15. The engine controller 15 outputs information of the actual engine rotational speed Na to the controller 100. The engine controller 15 compares the required engine rotational speed Nr from the controller 100 and the actual engine rotational speed Na detected by the rotational speed sensor 136 with refer en to the engine output torque characteristic E (refer to FIG. 4), and controls a fuel injection device 190a so that the actual engine rotational speed Na becomes equal to the required engine rotational speed Nr.

The clutch state determination section 100h determines, based on a detection signal from the clutch sensor 131 (refer to FIG. 3), whether the forward travel clutch 18 is in the engagement state and whether the backward travel clutch 19 is in the engagement state.

The restriction condition determination section 100c determines that the restriction condition holds when any of Condition 1a and Condition 1b below is satisfied and Condition 2 is satisfied.

Condition 1a: The forward travel clutch 18 is in the engagement state and the forward-backward travel switching lever 17 is switched to the backward travel (R) position.

Condition 1b: The backward travel clutch 19 is in the engagement state and the forward-backward travel switching lever 17 is switched to the forward travel (F) position.

Condition 2: The vehicle speed V of the wheel loader is equal to or lower than a torque restriction threshold Vt.

The torque restriction threshold Vt is the vehicle speed right before switching between the forward travel clutch 18 and the backward travel clutch 19 is performed, and is higher than a clutch switching threshold Vc to be described later (Vt>Vc). The torque restriction threshold Vt is stored in the storage device of the controller 100 in advance.

Condition 1a and Condition 1b are conditions for determining whether the traveling direction of the wheel loader, which corresponds to the engagement state of the clutch device 16, and the traveling direction of the wheel loader, which is instructed through the forward-backward travel switching lever 17 are opposite to each other.

The cancellation condition determination section 100*d* determines that a cancellation condition holds when any of Condition 3*a* and Condition 3*b* below is satisfied and Condition 4 is satisfied.

Condition 3*a*: The forward travel clutch 18 is in the engagement state and the forward-backward travel switching lever 17 is switched to the forward travel (F) position.

Condition 3*b*: The backward travel clutch 19 is in the engagement state and the forward-backward travel switching lever 17 is switched to the backward travel (R) position.

Condition 4: A value (speed difference) obtained by subtracting the actual engine rotational speed Na from the required engine rotational speed Nr is smaller than a threshold $\Delta N0$ (Nr−Na<$\Delta N0$).

The threshold $\Delta N0$ is a positive value set to determine whether lug down is sufficiently eliminated. The threshold $\Delta N0$ is set by, for example, an actual machine test in advance and stored in the storage device of the controller 100.

Condition 3*a* and Condition 3*b* are conditions for determining whether the traveling direction of the wheel loader, which corresponds to the engagement state of the clutch device 16, and the traveling direction of the wheel loader, which is instructed by the forward-backward travel switching lever 17 are same (the forward direction).

The torque characteristic setting section 100*e* selects a pump absorbing torque characteristic based on results of the determination by the restriction condition determination section 100*c* and the cancellation condition determination section 100*d*. At initial setting, the controller 100 sets the pump absorbing torque characteristic A1. In a state (also referred to as a non-restriction state) in which the pump absorbing torque characteristic A1 is set, when the restriction condition determination section 100*c* determines that the restriction condition holds, the torque characteristic setting section 100*e* sets the pump absorbing torque characteristic A2 and restricts the maximum absorbing torque of the main pump 11 to be low.

In a state (also referred to as a restriction state) in which the pump absorbing torque characteristic A2 is set, when the cancellation condition determination section 100*d* determines that the cancellation condition holds, a built-in timer of the controller 100 starts measuring a time (hereinafter referred to as a continuation time t) during which the cancellation condition holds. When the continuation time t of the cancellation condition becomes equal to or longer than a threshold t0, the torque characteristic setting section 100*e* sets the pump absorbing torque characteristic A1 cancels the restriction of the maximum absorbing torque of the main pump 11.

The threshold t0 is a time during which acceleration performance is to be improved with priority on the travel system after lug down is eliminated. The threshold t0 is stored in the storage device of the controller 100 in advance. The threshold t0 is set to an appropriate value by, for example, an actual machine test. The threshold t0 is set to be, for example, 0.1 seconds to 1.0 seconds inclusive.

The controller 100 calculates, with reference to the selected characteristic table (A1 or A2), the maximum pump absorbing torque based on the actual engine rotational speed Na detected by the rotational speed sensor 136. The controller 100 controls the displacement volume, in other words, tilt angle of the main pump 11 through the regulator 13 based on discharge pressure (load pressure) of the main pump 11, which is detected by a discharge pressure sensor (not illustrated), and the actual engine rotational speed Na detected by the rotational speed sensor 136, so that the maximum pump absorbing torque is not exceeded.

The clutch switching condition determination section 100*f* determines that a clutch switching condition holds when any of Condition 1*a* and Condition 1*b* described above is satisfied and Condition 5 below is satisfied.

Condition 5: The vehicle speed V of the wheel loader is equal to or lower than the clutch switching threshold Vc.

The clutch switching threshold Vc is the vehicle speed when the difference between the actual engine rotational speed Na and the required engine rotational speed Nr becomes substantially zero due to engine brake after a returning operation of the acceleration pedal 134. The clutch switching threshold Vc is set by, for example, an actual machine test in advance, and stored in the storage device of the controller 100.

The clutch control section 100*g* executes clutch switching control when the clutch switching condition determination section 100*f* determines that the clutch switching condition holds. When Condition 1*a* and Condition 5 are satisfied, the clutch control section 100*g* outputs a control signal to the transmission control device 20 and puts the forward travel clutch 18 into the release state and the backward travel clutch 19 into the engagement state. When Condition 1*b* and Condition 5 are satisfied, the clutch control section 100*g* outputs a control signal to the transmission control device 20 and puts the backward travel clutch 19 into the release state and the forward travel clutch 18 into the engagement state.

Figure 6:
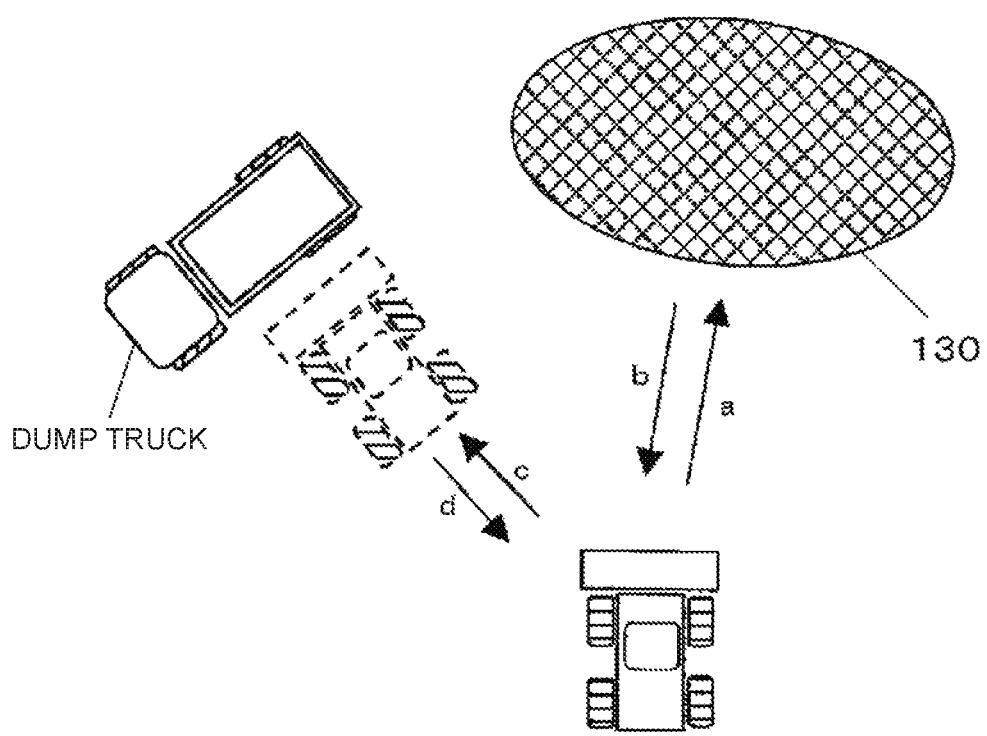
FIG. 6 is a diagram illustrating V-shape loading as a method of loading dirt or the like onto a dump truck.
Figure 7:
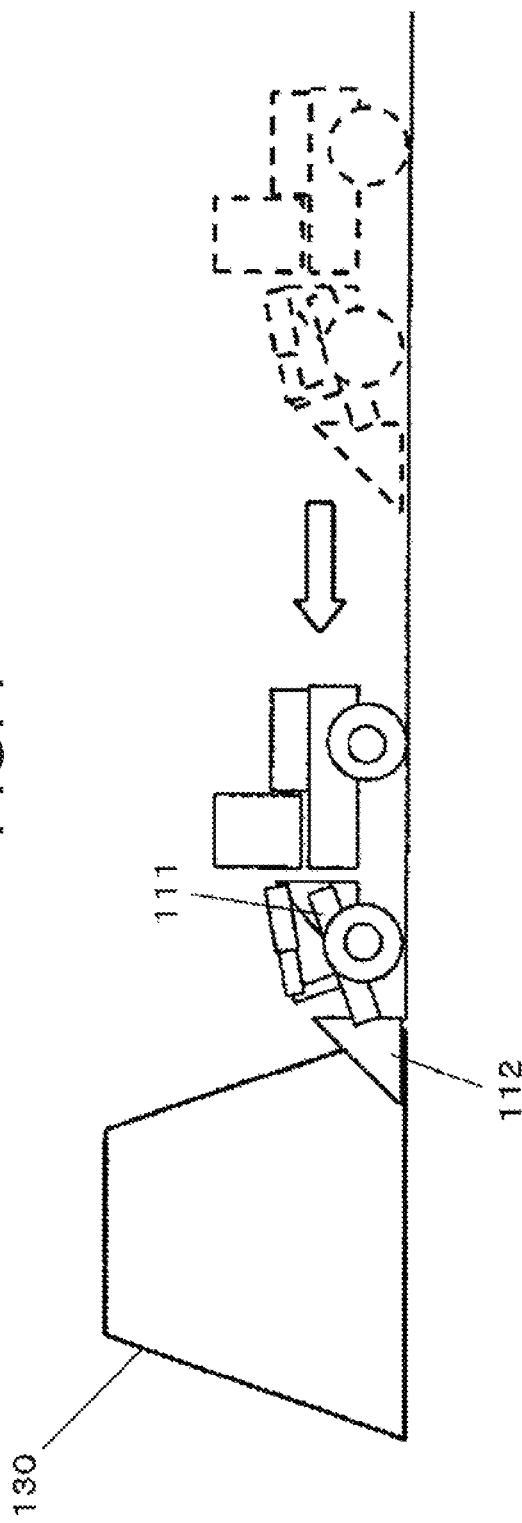
FIG. 7 is a diagram illustrating excavation work by the wheel loader.

FIG. 6 is a diagram illustrating V-shape loading as a method of loading dirt or the like onto a dump truck. FIG. 7 is a diagram illustrating excavation work by a wheel loader. In the V-shape loading, the wheel loader travels forward to a mound 130 of dirt or the like as illustrated with Arrow "a" in FIG. 6.

As illustrated in FIG. 7, the bucket 112 is plunged into the mound 130. Thereafter, the bucket 112 is operated and then the arm 111 is operated to move up, or the bucket 112 and the arm 111 are simultaneously operated and then only the arm 111 is operated to move up. In this manner, excavation work is performed.

When the excavation work ends, the wheel loader temporarily travels back as illustrated with Arrow "b" in FIG. 6. As illustrated with Arrow "c", the wheel loader then travels forward toward the dump truck and stops in front of the dump truck. Then, the wheel loader loads scooped dirt or the like onto the dump truck, and travels back to the original position as illustrated with Arrow "d". This is the basic operation of excavation and loading work in the V-shape loading.

During the excavation and loading work described above, for example, when the wheel loader travels forward as illustrated with Arrow "c" while traveling backward as illustrated with Arrow "b" in FIG. 6, the driver performs an operation to return the acceleration pedal 134 and an operation to switch the forward-backward travel switching lever 17 from backward travel to forward travel. At this transition from backward travel to forward travel, backward inertial energy of the vehicle acts, as a load, the engine 190 through the machine transmission unit 32. In addition, the driver operates, as preparation for loading work at the dump truck, the arm operation lever to an upward movement side at the transition from backward travel to forward travel, thereby moving up the arm 111. Accordingly, a load of the main pump 11 for driving the arm 111 acts on the engine 190. When this operation (hereinafter referred to as a combined travel switching operation) to switch the traveling direction from backward travel to forward travel and drive the front work device 119 is performed, the engine output torque becomes insufficient to drive the travel system and the work system, and as a result, lug down occurs. When the combined travel switching operation is performed, decrease of the actual engine rotational speed Na is large as compared to a case of transition from backward travel to forward travel without driving the front work device 119.

In the present embodiment, the pump absorbing torque characteristic A2 is set in place of the pump absorbing torque characteristic A1 (in other words, the maximum absorbing torque of the main pump 11 is restricted to be low) at the combined travel switching operation. Accordingly, the load of the main pump 11 acting on the engine 190 can be reduced. As a result, decrease of the actual engine rotational speed Na is reduced.

Figure 8:
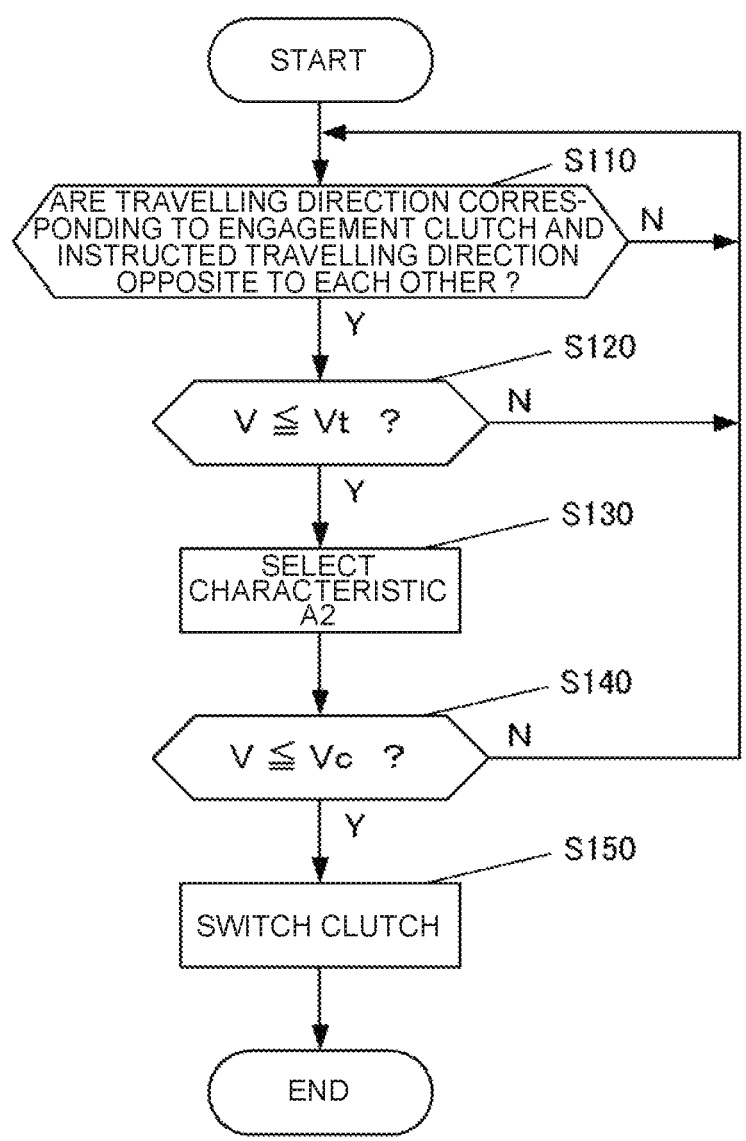
FIG. 8 is a flowchart of the content of processing of selecting a pump absorbing torque characteristic A2 in a non-restriction state in which a pump absorbing torque characteristic A1 is selected.
Figure 9:
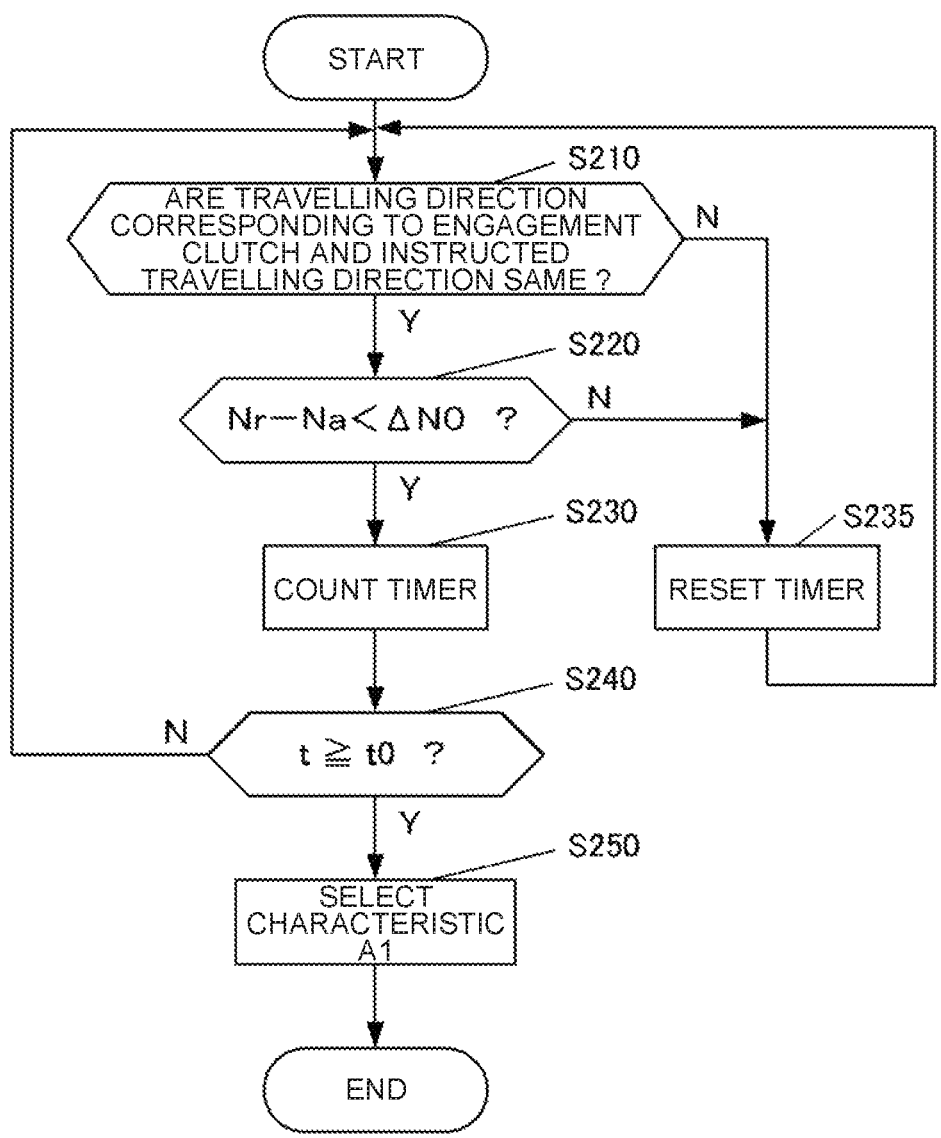
FIG. 9 is a flowchart of the content of processing of selecting the pump absorbing torque characteristic A1 in a restriction state in which the pump absorbing torque characteristic A2 is selected.

Control to select a pump absorbing torque characteristic will be described below with reference to flowcharts illustrated in FIGS. 8 and 9. FIGS. 8 and 9 are each a flowchart of operation of the controller 100 in the processing of control to select a pump absorbing torque characteristic. FIG. 8 illustrates the content of processing of selecting the characteristic A2 in the non-the restriction state in which the characteristic A1 is selected. FIG. 9 illustrates the content of processing of selecting the characteristic A1 in the restriction state in which the characteristic A2 is selected. FIG. 8 also illustrates clutch switching processing.

When an ignition switch (not illustrated) is turned on, initial setting (not illustrated) is performed, and then a computer program configured to perform the processing illustrated in FIG. 8 is activated and repeatedly executed by the controller 100 at a predetermined control period. With the initial setting, the characteristic A1 is selected as a pump absorbing torque characteristic, and the timer built-in of the controller 100 is reset (t=0). When the characteristic A1 is selected through the selection processing illustrated in the flowchart of FIG. 9 to be described later, the computer program configured to perform the processing illustrated in FIG. 8 is activated and repeatedly executed by the controller 100 at the predetermined control period. Although not illustrated, the controller 100 receives, at a predetermined control period, inputting of detection signals from various sensors such as the vehicle speed sensor 132, the clutch sensor 131, the operation amount sensor 134a, the rotational speed sensor 136, and the forward-backward travel switching lever 17, and operation signals from various operation members.

In step S110, the controller 100 determines whether Condition 1a or Condition 1b holds by comparing information on a clutch detected to be in the engagement state by the clutch sensor 131 and information on a direction instructed by the forward-backward travel switching lever 17. Specifically, the controller 100 determines whether the traveling direction of the wheel loader, which corresponds to the engagement state of the clutch device 16, and the traveling direction of the wheel loader, which is instructed by the forward-backward travel switching lever 17 are opposite to each other. The controller 100 repeatedly executes the processing in step S110 until positive determination is obtained. The process proceeds to step S120 when the determination is positive.

In step S120, the controller 100 determines whether the vehicle speed V detected by the vehicle speed sensor 132 is equal to or lower than the torque restriction threshold Vt. In other words, the controller 100 determines whether Condition 2 holds. The process proceeds to step S130 when the determination in step S120 is positive. The process returns to step S110 when the determination in step S120 is negative.

In step S130, the controller 100 selects the table (refer to FIG. 4) of the pump absorbing torque characteristic A2 in the storage device, and the process proceeds to step S140. In step S140, the controller 100 determines whether the vehicle speed V detected by the vehicle speed sensor 132 is equal to or lower than the clutch switching threshold Vc. In other words, the controller 100 determines whether Condition 5 holds. The process proceeds to step S150 when the determination in step S140 is positive. The process returns to step S110 when the determination in step S140 is negative.

In step S150, the controller 100 connects a hydraulic clutch (the forward travel clutch 18 or the backward travel clutch 19) corresponding to the operation position of the forward-backward travel switching lever 17, and releases the other hydraulic clutch (the backward travel clutch 19 or the forward travel clutch 18), which ends the characteristic selection processing illustrated in FIG. 8. When pressing force needed to achieve a completely contact engagement state is taken as 100%, pressing force applied to the hydraulic clutch is at 30% approximately at the connection of the hydraulic clutch, and then gradually increased.

When the characteristic A2 is selected through the selection processing illustrated in the flowchart of FIG. 8, a computer program configured to perform the processing illustrated in FIG. 9 is activated and repeatedly executed by the controller 100 at a predetermined control period.

In step S210, the controller 100 determines whether Condition 3a or Condition 3b holds by comparing information on a clutch detected to be in the engagement state by the clutch sensor 131 and information on a direction instructed by the forward-backward travel switching lever 17. Specifically, the controller 100 determines whether the traveling direction of the wheel loader, which corresponds to the engagement state of the clutch device 16, and the traveling direction of the wheel loader, which is instructed by the forward-backward travel switching lever 17 are same. The process proceeds to step S220 when the determination in step S210 is positive. The process proceeds to step S235 when the determination in step S210 is negative.

In step S220, the controller 100 determines whether Condition 4 holds, in other words, whether the value (speed difference) obtained by subtracting the actual engine rotational speed Na from the required engine rotational speed Nr is smaller than the threshold $\Delta N0$. The process proceeds to step S230 when the determination in step S220 is positive. The process proceeds to step S235 when the determination in step S220 is negative.

In step S235, the controller 100 resets the built-in timer, in other words, sets the continuation time t to be zero, and the process returns to step S210.

In step S230, the controller 100 counts the built-in timer, in other words, adds time $\Delta t$ corresponding to the control period to the continuation time t (t=t+$\Delta t$), and the process proceeds to step S290. In step S240, the controller 100 determines whether the continuation time t that is a value obtained by counting the timer is equal to or longer than the threshold t0. The process proceeds to step S250 when the determination in step S240 is positive. The process returns to step S210 when the determination in step S240 is negative.

In step S250, the controller 100 selects the table (refer to FIG. 4) of the pump absorbing torque characteristic A1 in the storage device, and ends the characteristic selection processing illustrated in FIG. 9.

As described above, in the present embodiment, the maximum pump absorbing torque is restricted to be low when the vehicle speed V has decreased to the torque restriction threshold Vt while the traveling direction corresponding to the engagement state of the clutch device 16 and the traveling direction instructed by the forward-backward travel switching lever 17 are opposite to each other. Accordingly, decrease of the actual engine rotational speed Na when the combined travel switching operation is performed can be reduced. Effects of the present embodiment will be described next through comparison with a comparative example.

Figure 10:
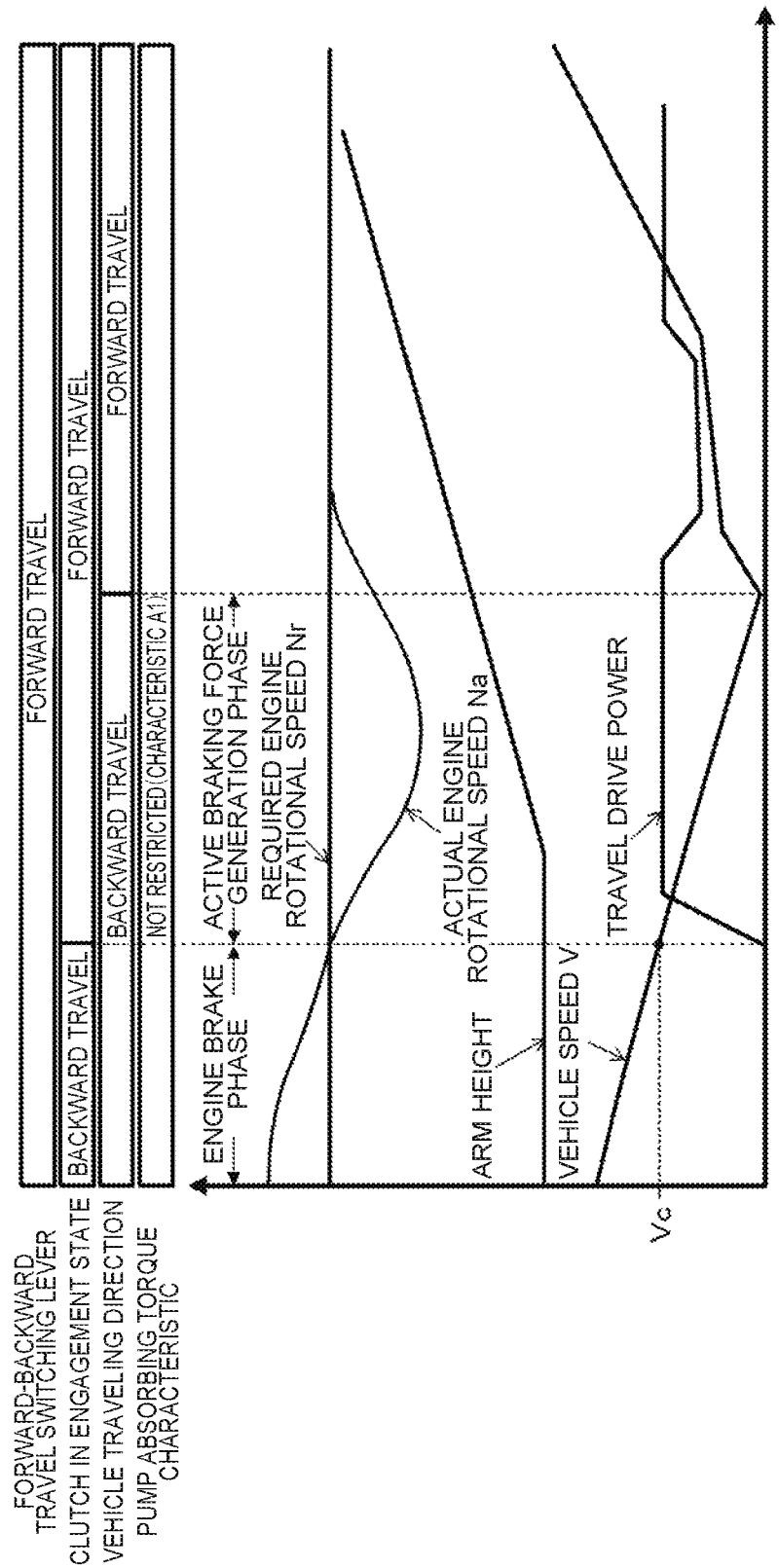
FIG. 10 is a diagram for description of behavior at a combined travel switching operation in a comparative example in which the displacement volume of a main pump 11 is controlled only with the pump absorbing torque characteristic A1.

FIG. 10 is a diagram for description of behavior at the combined travel switching operation in the comparative example in which the displacement volume of the main pump 11 is controlled only with the pump absorbing torque characteristic A1. The following describes a case in which the combined travel switching operation is performed by a wheel loader according to the comparative example.

As described above, when the wheel loader travels forward while traveling backward, the driver performs an operation to return the acceleration pedal 134, and an operation to switch the forward-backward travel switching lever 17 from backward travel to forward travel. After the returning operation, the acceleration pedal 134 is maintained at a predetermined operation amount to maintain the required engine rotational speed Nr constant. As illustrated in FIG. 10, the actual engine rotational speed Na is higher than the required engine rotational speed Nr right after the operation to return the acceleration pedal 134, and thus engine brake acts. In an engine brake phase in which this engine brake acts, the forward-backward travel switching lever 17 is already switched to the forward travel (F) position, but the backward travel clutch. 19 is still connected.

When the wheel loader is decelerated by the engine brake and the vehicle speed decreases to the clutch switching threshold Vc, the backward travel clutch 19 is released and the forward travel clutch 18 is connected.

When the forward travel clutch 18 is connected, the engine 190 generates force (travel drive power) opposite to the traveling direction of the vehicle to actively brake the vehicle. In a phase in which this active braking force is generated, the actual engine rotational speed Na is lower than the required engine rotational speed Nr.

When the driver operates the arm operation lever to the upward movement side in the active braking force generation phase, the arm 111 starts moving up. When the wheel loader transitions from backward travel to forward travel, the travel system and the work system are driven in a combined manner, and thus the engine output torque becomes insufficient. Accordingly, lug down occurs, and the actual engine rotational speed Na largely decreases. When the actual engine rotational speed Na becomes significantly lower than the required engine rotational speed Nr, the controller 100 reduces the displacement volume of the HST motor 50 to prevent engine stall, causing temporary drop of the travel drive power, called "halt", and as a result, the increase rate of the vehicle speed V temporarily decreases. Accordingly, the driver potentially feels discomfort such as insufficient acceleration after the transition from backward travel to forward travel.

Figure 11:
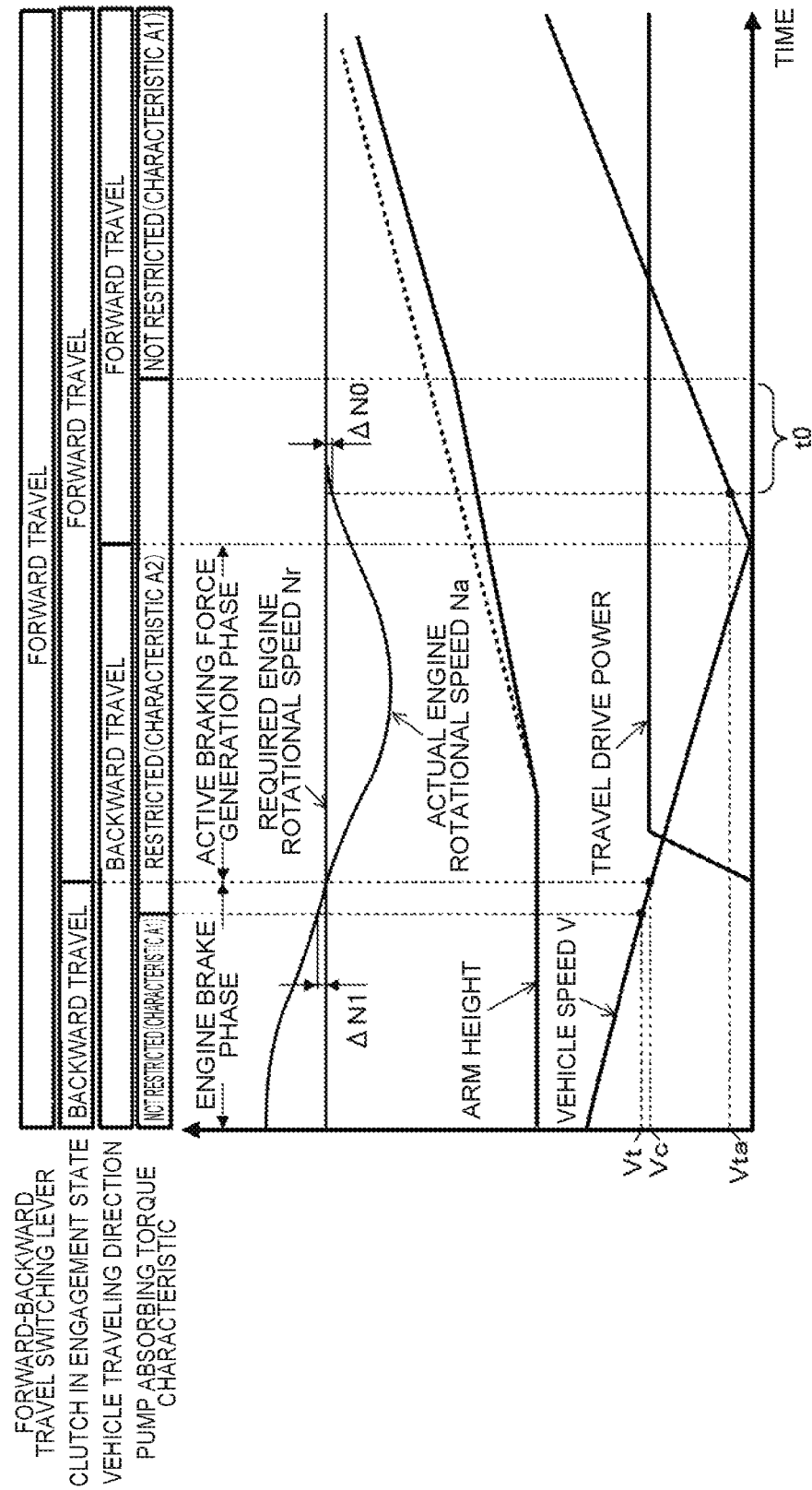
FIG. 11 is a diagram for description of behavior at the combined travel switching operation in the present embodiment.

FIG. 11 is a diagram for description of behavior at the combined travel switching operation in the present embodiment. In the present embodiment, when the wheel loader is decelerated by engine brake and the vehicle speed V decreases to the torque restriction threshold Vt in the engine brake phase, the restriction condition holds and the pump absorbing torque characteristic A2 is set (Yes at S110, Yes at S120, and S130). Thereafter, when the vehicle speed V decreases to the clutch switching threshold Vc, the clutch switching condition holds, and the backward travel clutch 19 is released whereas the forward travel clutch 18 is connected (Yes at S110, Yes at S140, and S150).

In the present embodiment, since the pump absorbing torque characteristic A2 is set in the active braking force generation phase, the operation of the work system is restricted, and the drive power of the engine 190 is distributed to the travel system in priority. Accordingly, the amount of decrease of the actual engine rotational speed Na can be reduced as compared to the comparative example. As a result, temporary drop of the travel drive power and temporary decrease of the increase rate of the vehicle speed V can be reduced or prevented. This leads to reduction of driver's discomfort such as the feeling of insufficient acceleration.

The operation to move up the arm 111 is performed at a stage before the forward-backward travel switching lever 17 is switched from backward travel to forward travel in some cases. In such a case, too, the amount of decrease of the actual engine rotational speed can be reduced, and thus discomfort such as the feeling of insufficient acceleration can be reduced accordingly.

The above-described embodiment provides effects as described below.

(1) The wheel loader includes the variable capacity main pump 11 driven by the engine 190, the front work device 119 driven by hydraulic oil discharged from the main pump 11, and the travel drive device 30 configured to transfer drive power of the engine 190 to the wheels 113 through the HMT 3 including the machine transmission 32. The wheel loader includes: the clutch device 16 including the forward travel clutch 18 configured to cause, when being in the engagement state, the wheel loader to travel in the forward travel direction, and the backward travel clutch 19 configured to cause, when being in the engagement state, the wheel loader to travel in the backward travel direction; the forward-backward travel switching lever 17 configured to instruct the wheel loader to travel in the forward travel direction or the backward travel direction; and the clutch sensor 131 configured to detect whether the forward travel clutch 18 and the backward travel clutch 19 are each in the engagement state. The controller 100 restricts the maximum absorbing torque of the main pump 11 to be low when the restriction condition holds, the restriction condition including a condition that the traveling direction of the wheel loader, which corresponds to the engagement state of the clutch device 16, and the traveling direction of the wheel loader, which is instructed by the forward-backward travel switching lever 17 are opposite to each other.

With this configuration, lug down that occurs when the front work device 119 is operated at transition from backward travel to forward travel can be reduced. As a result, driver's discomfort such as the feeling of insufficient acceleration after the transition from backward travel to forward travel can be reduced.

(2) The controller 100 outputs a control signal (clutch switching signal) to the transmission control device 20 when an instruction signal to put one of the forward travel clutch 18 and the backward travel clutch 19 into the engagement state through the forward-backward travel switching lever 17 is detected while the other of the forward travel clutch 18 and the backward travel clutch 19 is in the engagement state, and when the vehicle speed V detected by the vehicle speed sensor 132 is equal to or lower than the clutch switching threshold Vc. The transmission control device 20 executes clutch switching control to put the other of the forward travel clutch 18 and the backward travel clutch 19 into the engagement state based on the control signal (clutch switching signal) from the controller 100.

In the present embodiment, the restriction condition includes a condition that the vehicle speed V is higher than the clutch switching threshold Vc and equal to or lower than the torque restriction threshold Vt set to be higher than the clutch switching threshold Vc. With this configuration, at a stage before the clutch switching control, the maximum absorbing torque of the main pump 11 can be restricted to be low based on the vehicle speed V. The pump torque restriction control can be executed at an appropriate timing so that the influence of a load of the main pump 11 on the travel drive power is minimized. As illustrated in FIG. 11, since the maximum absorbing torque of the main pump 11 is restricted to be low right before the clutch switching control, the front work device can be operated in the non-the restriction state until right before the clutch switching control, thereby achieving improved operation efficiency.

(3) The controller 100 determines the required engine rotational speed Nr and outputs the determined speed to the engine controller 15. The engine controller 15 controls the fuel injection device 190a of the engine 190 so that the actual engine rotational speed Na detected by the rotational speed sensor 136 becomes equal to the required engine rotational speed Nr. The controller 100 cancels restriction of the maximum absorbing torque of the main pump 11 when the cancellation condition holds, the cancellation condition including a condition that the traveling direction of the wheel loader, which corresponds to the engagement state of the clutch device 16, and the traveling direction of the wheel loader, which is instructed by the forward-backward travel switching lever 17 are same, and a condition the difference between the required engine rotational speed Nr and the actual engine rotational speed Na is smaller than a predetermined value.

Since restriction of the pump torque is canceled after the difference between the actual engine rotational speed Na and the required engine rotational speed Nr becomes sufficiently small, the acceleration performance can be improved as compared to a case in which the restriction is canceled before the difference between the actual engine rotational speed Na and the required engine rotational speed Nr becomes sufficiently small.

(4) In the present embodiment, restriction of the maximum absorbing torque of the main pump 11 is canceled when the continuation time t in which the cancellation condition holds exceeds a predetermined time (the threshold t0). Accordingly, the power of the engine 190 can be distributed to the travel system in priority only for the predetermined time (threshold t0) after transition from backward travel to forward travel, thereby further improving the acceleration performance.

Modifications as described below are included in the scope of the present invention, and one or a plurality of the modifications may be combined with the above-described embodiment.

(Modification 1)

The restriction condition is not limited to the above-described embodiment. For example, the restriction condition may be set as described below.

(Modification 1-1)

Condition 2A below may be added in place of Condition 2 described above.

Condition 2A: The rotational speed difference $\Delta N$ obtained by subtracting the required engine rotational speed Nr from the actual engine rotational speed Na is smaller than a threshold $\Delta N1$ (refer to FIG. 11).

The threshold $\Delta N1$ is the speed difference when Condition 2 described above is satisfied. The threshold $\Delta N1$ is set by, for example, an actual machine test in advance and stored in the storage device of the controller 100.

(Modification 1-2)

Condition 2 described above may be omitted. In other words, it may be determined that the restriction condition holds when any of Condition 1a and Condition 1b described above is satisfied.

(Modification 2)

The cancellation condition is not limited to the above-described embodiment. For example, the cancellation condition may be set as described below.

(Modification 2-1)

Condition 4A below may be added in place of Condition 4 described above.

Condition 4A: The vehicle speed V of the wheel loader is equal to or larger than a restriction cancellation threshold Vta.

The restriction cancellation threshold Vta is the vehicle speed V when Condition 4 described above is satisfied. The restriction cancellation threshold Vta is set by, for example, an actual machine test in advance and stored in the storage device of the controller 100.

(Modification 2-2)

Condition 4 described above may be omitted. In other words, it may be determined that the cancellation condition holds when any of Condition 3a and Condition 3b described above is satisfied. In this case, it is preferable to cancel restriction of the maximum absorbing torque of the main pump 11 after the continuation time t in which the cancellation condition holds exceeds a threshold t1 longer than the threshold t0 (t1>t0).

(Modification 2-3)

A cancellation switch (not illustrated) may be provided to the operation lever for operating the arm 111 or the bucket 112, and it may be determined that the cancellation condition holds when the cancellation switch is operated, in place of Condition 4 described above.

(Modification 3)

In the above-described embodiment, restriction of the maximum absorbing torque of the main pump 11 by the controller 100 is canceled when the continuation time in which the cancellation condition holds (Condition 3a or Condition 3b holds, and Condition 4 holds) exceeds the predetermined time (threshold t0), but the present invention is not limited thereto. The restriction of the maximum absorbing torque of the main pump 11 may be canceled immediately when the cancellation condition holds.

(Modification 4)

A cancellation condition at parking may be set as described below so that the pump absorbing torque characteristic A1 is selected when the cancellation condition at parking holds in addition to or in place of the above-described cancellation condition.

The cancellation condition determination section 100d determines that the cancellation condition at parking holds when any of Condition 6, Condition 7, and Condition 8 for determining that the vehicle is in a parking state is satisfied.

Condition 6: A predetermined set time has elapsed in a state in which the forward travel clutch 18 is in the release state and the backward travel clutch 19 is in the release state.

Condition 7: A predetermined set time has elapsed in a state in which the forward-backward travel switching lever 17 is switched to the neutral (N) position.

Condition 8: A parking brake device is actuated.

When it is determined that the cancellation condition at parking holds, the torque characteristic setting section 100e sets the pump absorbing torque characteristic A1. According to this modification, dirt removing work performed before the driver gets off after parking the wheel loader can be efficiently performed. In the dirt removing work, shock is intentionally generated by dumping the bucket 112 to a stroke end to shake off any dirt stuck to the bucket 112. Larger shock can be generated with a faster rotational speed of the bucket 112, thereby achieving improved operability.
(Modification 5)

In the above-described embodiment, in the combined travel Switching operation, the arm 111 is operated to move up at transition from backward travel to forward travel, but the present invention is not limited thereto. For example, the effects as described above can be achieved when the arm 111 is operated to move up at transition from forward travel to backward travel.

The effects as described above when hydraulic oil discharged from the main pump 11 is guided to the steering cylinder 116 can be achieved when steering operation to right and left is performed at transition from backward travel to forward travel.
(Modification 6)

In the above description, the present invention applies to both of the transition operation from forward travel to backward travel and the transition operation from backward travel to forward travel, but the present invention is not limited thereto. The maximum absorbing torque of the main pump 11 may be restricted to be low at least when a forward travel instruction is performed through the forward-backward travel switching lever 17 while the backward travel clutch 19 is in the engagement state.
(Modification 7)

In the above-described embodiment, the torque restriction threshold Vt of the vehicle speed V is set to be higher than the clutch switching threshold Vc, but the present invention is not limited thereto. The clutch switching threshold Vc and the torque restriction threshold Vt may be equal to each other.
(Modification 8)

Figure 12:
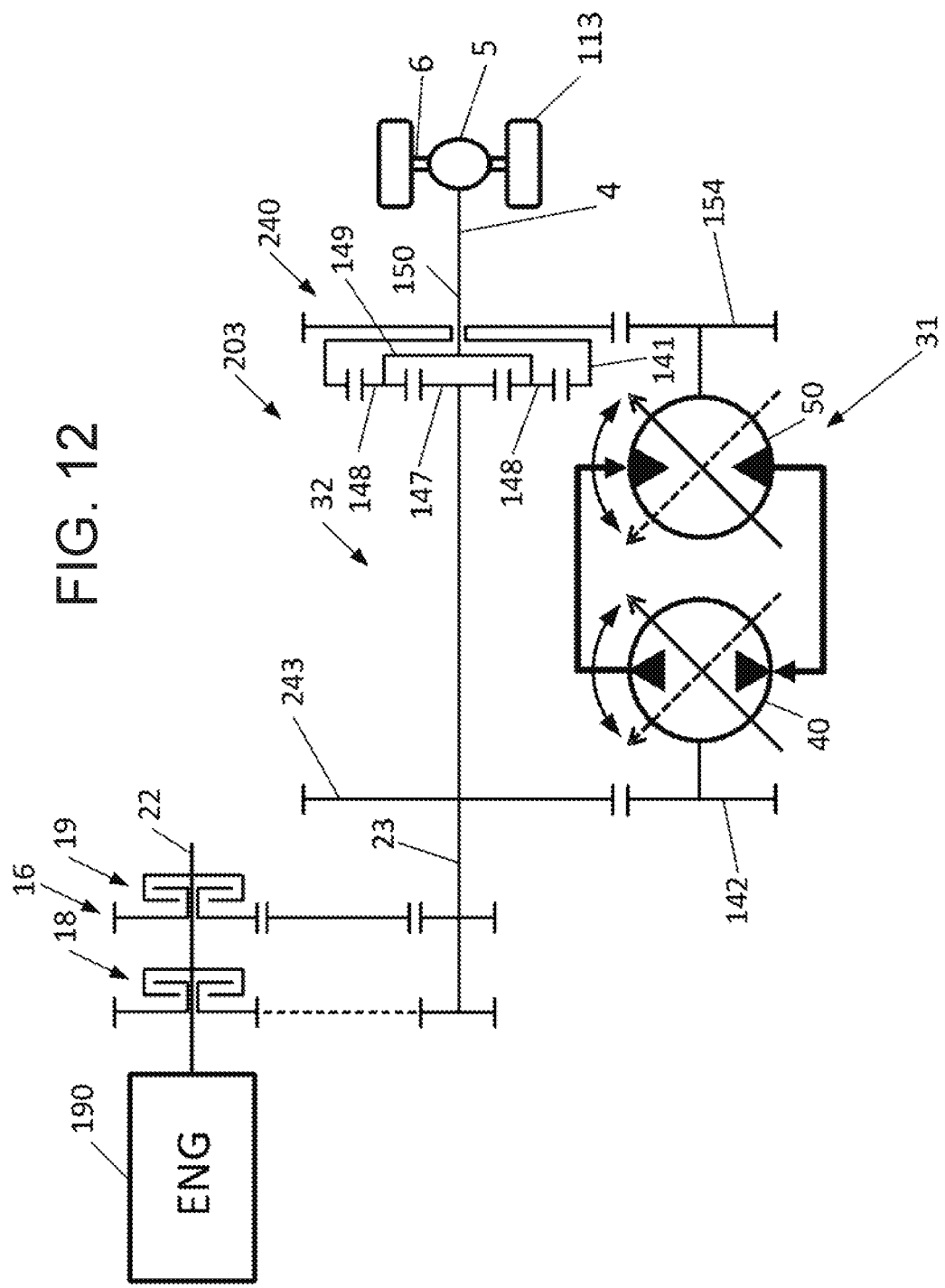
FIG. 12 is a diagram illustrating a schematic configuration of a HMT of output division type according to a modification.

In the above-described embodiment, the HMT 3 (refer to FIG. 3) is of input division type, but the present invention is not limited thereto. As illustrated in FIG. 12, a HMT 203 of output division type may be employed in place of the HMT 3 of input division type. In the HMT 203 of output division type, the HST pump 40 connected with, through a hydraulic circuit, the HST motor 50 coupled with a planetary gear mechanism 240 is coupled with the input shaft 23 of the transmission at an equal rotational ratio. In the present modification, the output torque of the engine 190 is transferred to the HST 31 and the machine transmission unit 32 in parallel to drive the wheels 113 through the planetary gear mechanism 240.

As illustrated in FIG. 12, in the HMT 203 of output division type, the rotational force of the input shaft 23 is transferred to the HST 31 through a gear 243 of the input shaft 23 and the pump input gear 142. The sun gear 147 of the planetary gear mechanism 240 is fixed to the input shaft 23. The plurality of planetary gears 148 are provided around and meshed with the sun gear 147. Each planetary gear 148 is pivotally supported by the planetary carrier 149 fixed to the output shaft 150. The output shaft 150 is connected with the propeller shaft 4. The ring gear 141 is provided around and meshed with the planetary gears. The motor output gear 154 is provided around and meshed with the ring gear 141. The motor output gear 154 is fixed to the rotational shaft of the HST motor 50.
(Modification 9)

In the above-described embodiment, the wheel loader includes a HMT, but the present invention is not limited thereto. The present invention is applicable to a wheel loader including an electro-mechanical transmission (EMT) 303 in place of the HMTs 3 and 203 illustrated in FIGS. 3 and 12. In this case, an electric generator 340 is provided in place of the HST pump 40, and an electric motor 350 is provided in place of the HST motor 50.

Figure 13:
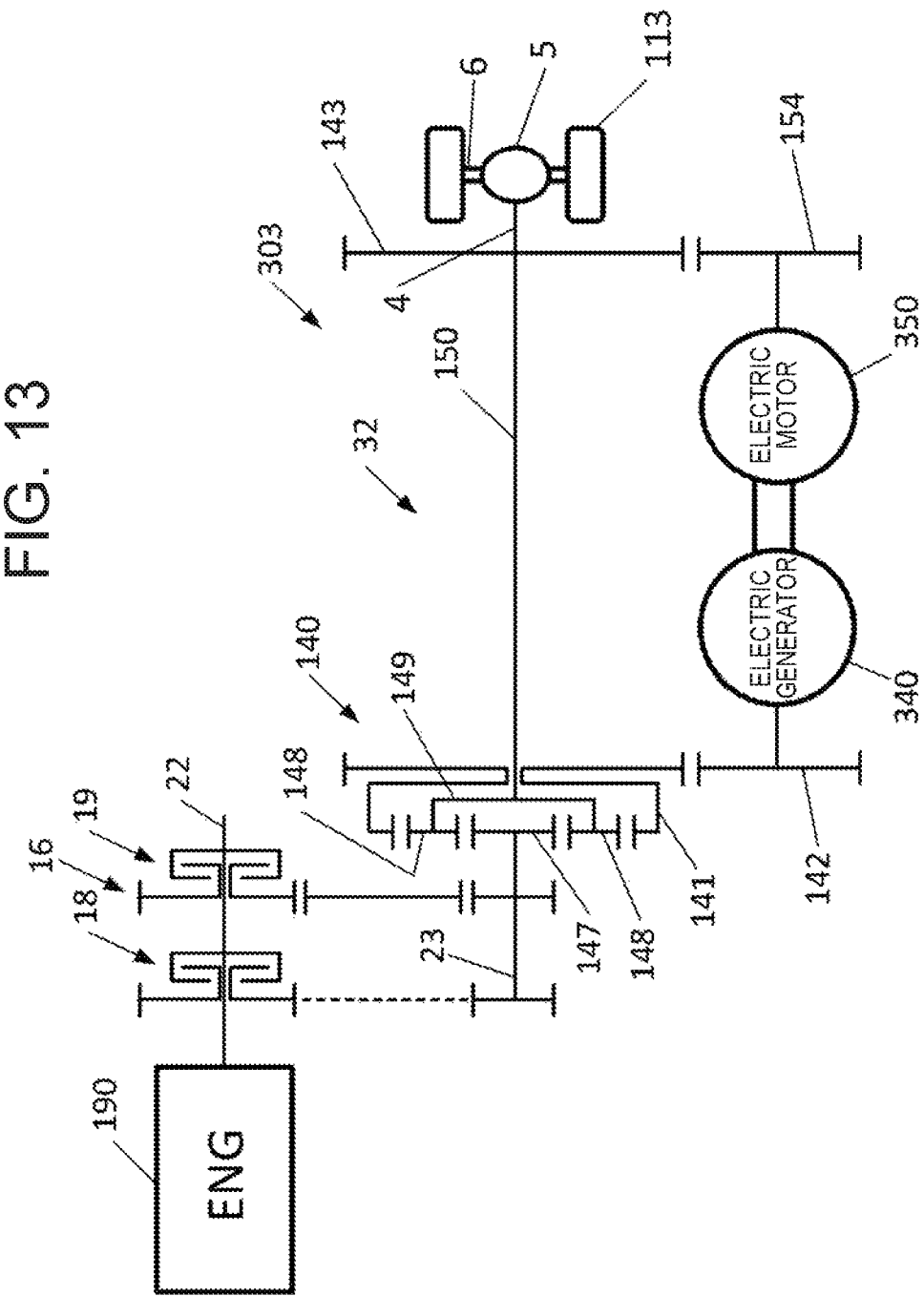
FIG. 13 is a diagram illustrating a schematic configuration of an EMT according to a modification.

In the present modification, as illustrated in FIG. 13, the output torque of the engine 190 is transferred through the planetary gear mechanism 140 to electric torque transfer by the electric generator 340 and the electric motor 350 and mechanical direct drive torque transfer by the machine transmission unit 32 in parallel, thereby driving the wheels 113. Alternatively, although not illustrated, the output torque of the engine 190 may be transferred to electric torque transfer by the electric generator 340 and the electric motor 350 and mechanical direct drive torque transfer by the machine transmission unit 32 in parallel, and then through the planetary gear mechanism, thereby driving the wheels 113.

In the EMT 303, when the combined travel switching operation is performed, the controller 100 drops the output of the electric motor 350 to reduce a load on the engine 190, thereby preventing engine stall. Accordingly, like the comparative example described above, the drop of the output of the electric motor 350 when the pump absorbing torque is not restricted causes the above-described "halt" of the travel drive power, and as a result, the increase rate of the vehicle speed temporarily decreases. Thus, in the wheel loader including the EMT 303, too, the same effects of the above-described embodiment can be obtained by restricting the maximum absorbing torque of the main pump 11 to be low when the combined travel switching operation is performed.
(Modification 10)

The operation lever 31a for operating the control valve 21 may be an electric lever instead of a hydraulic pilot lever. In the above description, the forward-backward travel switching lever 17 is employed as a forward-backward travel switching instruction device, but a forward-backward travel switching switch is applicable.
(Modification 11)

In the above-described embodiment, the work vehicle is exemplary a wheel loader, but the present invention is not limited thereto. The work vehicle may be any other work vehicle such as a wheel shovel, a folk lift, a telehandler, or a lift truck.

The above description is made on various kinds of embodiments and modifications, but the present invention is not limited to these contents. Any other aspect in the technical scope of the present invention is included in the scope of the present invention.

REFERENCE SIGNS LIST

3 HMT (transmission), 11 main pump (hydraulic pump), 15 engine controller (engine control device), 16 clutch device, 17 forward-backward travel switching lever (forward-backward travel instruction device), 18 forward travel clutch (forward-travel clutch), 19 backward travel clutch (backward-travel clutch), 20 transmission control device (clutch control device), 32 machine transmission unit, 100 controller (clutch control device), 100*b* required speed determination section, 100*e* torque characteristic setting section. (torque restriction section, restriction cancellation section), 119 front work device (Work device), 131 clutch sensor (clutch state detection unit), 132 vehicle speed sensor (vehicle speed detection device), 136 rotational speed sensor (actual speed detection device), 190 engine, 203 HMT (transmission), 303 EMT (transmission) Vc clutch switch threshold (first speed), Vt torque restriction threshold (second speed)

The invention claimed is:

1. A wheel loader including a variable-capacity hydraulic pump driven by an engine, a work device driven by hydraulic oil discharged from the variable-capacity hydraulic pump, and a travel drive device configured to transfer drive power of the engine to wheels through a transmission including a machine transmission unit, the wheel loader comprising:

a forward-travel clutch configured to cause, when being in an engagement state, the wheel loader to travel in a forward travel direction, and a backward-travel clutch configured to cause, when in an engagement state, the wheel loader to travel in a backward travel direction;

a forward-backward travel switching lever configured to instruct the wheel loader to travel in the forward travel direction or the backward travel direction;

a clutch sensor configured to detect whether the forward-travel clutch and the backward-travel clutch are each in the engagement state; and a controller configured to restrict a maximum absorbing torque of the variable-capacity hydraulic pump to be low at a stage before control in which the backward-travel clutch is switched to the forward-travel clutch, when a restriction condition holds, the restriction condition including a condition that the backward-travel clutch is in the engagement state while the forward-backward travel switching lever performs the instruction to put the forward-travel clutch into the engagement state.

2. The wheel loader according to claim 1, further comprising:

a vehicle speed sensor configured to detect a vehicle speed of the wheel loader, wherein the controller is configured to execute clutch switching control to release the backward-travel clutch and put the forward-travel clutch into the engagement state when the forward-backward travel switching lever performs the instruction to put the forward-travel clutch into the engagement state while the backward-travel clutch is in the engagement state and when the vehicle speed of the wheel loader becomes lower than a clutch switch threshold, and the restriction condition includes a condition that the vehicle speed of the wheel loader is equal to or lower than a torque restriction threshold set to be higher than the clutch switch threshold.

3. The wheel loader according to claim 1, further comprising:

a rotational speed sensor configured to detect an actual rotational speed of the engine; and an engine controller configured to control the engine so that the actual rotational speed of the engine becomes equal to the required rotational speed which is determined by the controller, wherein the controller is further configured to cancel restriction of the maximum absorbing torque of the variable-capacity hydraulic pump when a cancellation condition holds, the cancellation condition including a condition that a traveling direction of the wheel loader, which corresponds to engagement states of the forward-travel clutch and the backward-travel clutch, and a traveling direction of the wheel loader, which is instructed by the forward-backward travel switching lever are same, and a condition that a difference between the required rotational speed and the actual rotational speed is smaller than a predetermined value.

4. The wheel loader according to claim 3, wherein the controller cancels restriction of the maximum absorbing torque of the variable-capacity hydraulic pump when a time in which the cancellation condition holds exceeds a predetermined time.

* * * * *